M. B. Miller,

Rotary Churn.

No. 88,320.    Patented Mar. 30, 1869.

Witnesses:
H. W. Mills
James W. Miller

Inventor:
Morgan B. Miller

MORGAN B. MILLER, OF PEORIA COUNTY, ILLINOIS.

Letters Patent No. 88,320, dated March 30, 1869.

IMPROVEMENT IN CHURNS.

The Schedule referred to in these Letters Patent and making part of the same.

Be it known that I, MORGAN B. MILLER, of the county of Peoria, and State of Illinois, have invented a new and useful Churn; and I do hereby declare that the following is a full, clear, and exact description of the construction and operation of the same, reference being had to the annexed drawings, making a part of this specification, in which—

Figure 1:
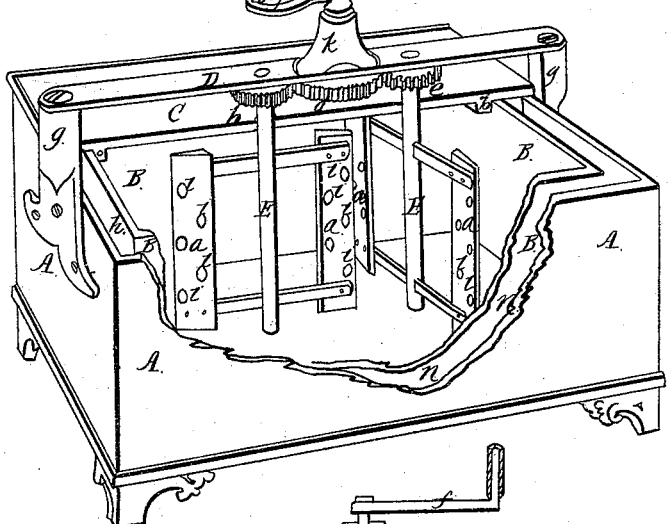
Figure 2:
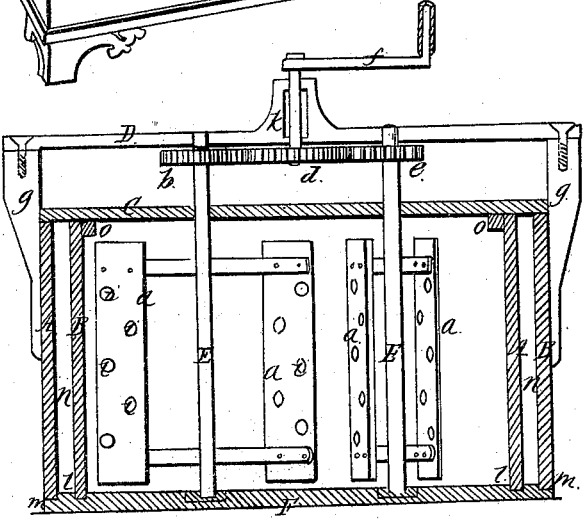
Figure 3:
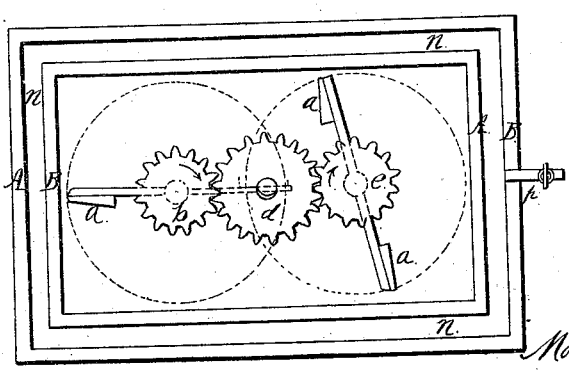

Figure 1 is a perspective view.
Figure 2, a longitudinal section.
Figure 3, a plan.

In the drawings, like figures refer to like parts.

On a bottom piece, F, I erect, at an inch or two from the edge, an oblong box, properly fastened together, and of a convenient size, B, letting the lower edges of the box into a groove, l, in the bottom piece F.

This cistern B, I surround with an outer box, A, rising from the groove m cut in the edge of the bottom piece F, and reaching to the level of the inner cistern B.

Both cisterns are covered by the pieces C C, for keeping the cream within bounds.

Within the inner cistern B, I set the two dashers E E, with two dash-boards a a to each shaft, attached to two arms, each arm passing through the shaft, which, for convenience of preventing the cream from adhering thereto, I make of wood, being an absorbent substance, particularly of water.

The dashers are so placed, that in revolving, the dash-boards a a of each dasher sweep far within the radius of the adjoining dasher. (See fig. 3.)

The motion is given to the two dashers by means of a spur-wheel, d, and crank, f, placed between the pinions crowning, b e, each shaft.

The crank-wheel d revolves about one turn to one and a half revolution of each pinion and shaft.

The gearing is sustained by a cross-bar, D, supported by braces at each end of the churn, and is perforated for the admission of the shafts, and having an extra bearing above its surface for the crank-axle.

The dash-boards a a may be inclined by proper attachment to the arms, so as to throw the cream downward, if necessary. I also make them thicker at their inner edges, and inclining to a thinner edge on the outer side, so as to increase the centrifugal throw of the dasher. Further, the boards are also perforated with several holes, i i i, &c., to increase the churning-action.

The operation of this churn is as follows:

Before and during the time of using it, the temperature required for the conversion of the cream is obtained, by filling the space n, between the cisterns A B, with water of a proper temperature. The covers C C are fitted on, the rib o completely closing the inner cistern B, or preventing the dashing over of the cream. The dashers and shafts E E are set in motion by the crank f, spur-wheel d, and pinions b e; the dashers being so placed that they sweep into space alternately occupied by each dash-board, work over, and churn two-thirds of the whole quantity of the cream; the effect being to greatly increase the churning and converting-action by this device. The churns may be taken out by unscrewing the bar D from the braces g g. The water may be let out by means of the valve p.

The advantages of this machine are partially stated above; viz, the facility over old churns; in addition to which the butter is much improved, as the necessity of tempering the same, by pouring water into the cream during the common process of churning, is evaded by my double cistern, where hot, warm, or cold water is introduced around the cream-box B. The interdashing of the two churns, or dashers E E, however, I consider the principal improvement, and the advantages, it is thought, are so self-evident as to need no enlargement thereon.

What I claim as my invention, and desire to secure by Letters Patent, is—

1. The use of either vertical or inclined dash-boards a a, tapering from their inner to their outer edges, with or without perforations, arranged around a pair of vertical shafts, E E, so placed that a dasher on either shaft alternately passes through the same space, and within the radius of the dasher on the other shaft, substantially as described, and for the purposes set forth.

2. In combination with the above, and working together, the interior cistern B, the outer, or tempering-cistern A, the covers C C, and the gearing b d e, all operating substantially as described, and for the purposes set forth.

MORGAN B. MILLER.

Witnesses:
HENRY W. WELLS,
JEROME H. MILLER.